US012598255B2

(12) United States Patent
Makhija

(10) Patent No.: US 12,598,255 B2
(45) Date of Patent: Apr. 7, 2026

(54) SYSTEMS AND METHODS FOR AUTOMATING MEDIA OPTIMIZATION USING CALL ANALYTICS

(71) Applicant: T-Mobile Innovations LLC, Overland Park, KS (US)

(72) Inventor: Nishant Makhija, Snohomish, WA (US)

(73) Assignee: T-Mobile Innovations LLC

( * ) Notice: Subject to any disclaimer, the term of this patent is extended or adjusted under 35 U.S.C. 154(b) by 216 days.

(21) Appl. No.: 18/459,004

(22) Filed: Aug. 30, 2023

(65) Prior Publication Data

US 2025/0080655 A1 Mar. 6, 2025

(51) Int. Cl.
*H04M 3/00* (2024.01)
*H04M 3/22* (2006.01)
*H04M 3/51* (2006.01)

(52) U.S. Cl.
CPC ....... *H04M 3/5191* (2013.01); *H04M 3/2281* (2013.01)

(58) Field of Classification Search
CPC .......................... H04M 3/5191; H04M 3/2281
USPC ...... 379/265.01–265.14, 266.01–266.1, 309, 379/266.01–266.1
See application file for complete search history.

(56) References Cited

U.S. PATENT DOCUMENTS

| | | | | |
|---|---|---|---|---|
| 9,042,530 B2 * | 5/2015 | Cooper | ................. | H04M 3/533 |
| | | | | 379/90.01 |
| 2004/0030798 A1 * | 2/2004 | Andersson | ......... | H04N 21/2402 |
| | | | | 348/E7.071 |
| 2005/0080915 A1 * | 4/2005 | Shoemaker | ........... | H04L 65/764 |
| | | | | 709/231 |
| 2009/0006694 A1 * | 1/2009 | Horvitz | .............. | H04N 21/4755 |
| | | | | 710/262 |
| 2020/0162774 A1 * | 5/2020 | Galuten | ........... | H04N 21/25891 |
| 2022/0394212 A1 * | 12/2022 | Chandok | .................. | H04N 7/15 |

* cited by examiner

*Primary Examiner* — William J Deane, Jr.

(57) ABSTRACT

A method for automating media optimization for communication system providers using call analytics. The method includes monitoring activity of a user accessing an online platform of the communication system provider, and receiving a telephone call made by a caller to a call center of the communication system provider, the call being associated with an offer. The method additionally includes determining that an identity of the user accessing the online platform is the same as an identity of the caller. The method further includes providing feedback data to the communication system provider including the identity of the user, and optimizing a media experience hosted on the online platform of the communication system provider based on the feedback data.

20 Claims, 10 Drawing Sheets

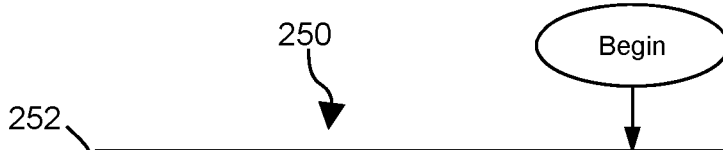

250

Begin

252

Monitor by a data linking engine activity of a user accessing an online platform of the communication system provider whereby the user is exposed to a media experience hosted on the online platform in an attempt by the user to complete an order for services providable by the communication system provider.

254

Receive by the communication system provider a telephone call made by a caller to a call center of the communication system provider, the call being associated with the order.

256

Determine by a call analytics engine that an identity of the user accessing the online platform is the same as an identity of the caller based on at least one of a deterministic analysis implemented by a deterministic analysis module and a probabilistic analysis implemented by a probabilistic analysis module and using information sourced from both the monitored activity of the user accessing the online platform and the telephone call made by the caller.

258

Determine by the data linking engine a completion of the order by the user for the services providable by the communication system provider.

260

Provide by the call analytics engine feedback data to at least one of the communication system providers and a third-party enterprise, the feedback data containing the identity of the user and a confirmation of the completion of the order by the user for the services providable by the communication system provider.

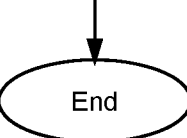

End

FIG. 4

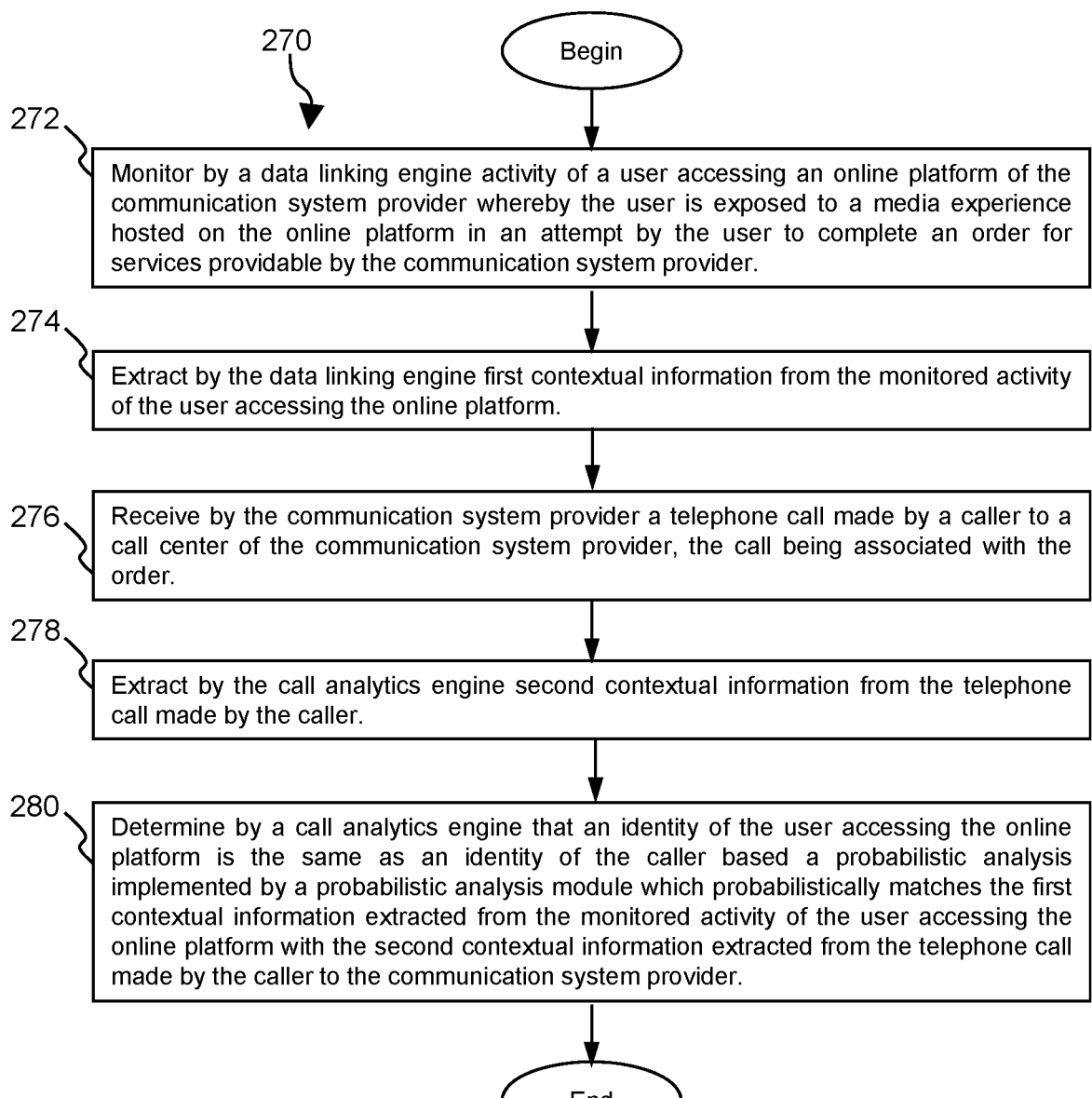

270

Begin

272

Monitor by a data linking engine activity of a user accessing an online platform of the communication system provider whereby the user is exposed to a media experience hosted on the online platform in an attempt by the user to complete an order for services providable by the communication system provider.

274

Extract by the data linking engine first contextual information from the monitored activity of the user accessing the online platform.

276

Receive by the communication system provider a telephone call made by a caller to a call center of the communication system provider, the call being associated with the order.

278

Extract by the call analytics engine second contextual information from the telephone call made by the caller.

280

Determine by a call analytics engine that an identity of the user accessing the online platform is the same as an identity of the caller based a probabilistic analysis implemented by a probabilistic analysis module which probabilistically matches the first contextual information extracted from the monitored activity of the user accessing the online platform with the second contextual information extracted from the telephone call made by the caller to the communication system provider.

End

FIG. 5

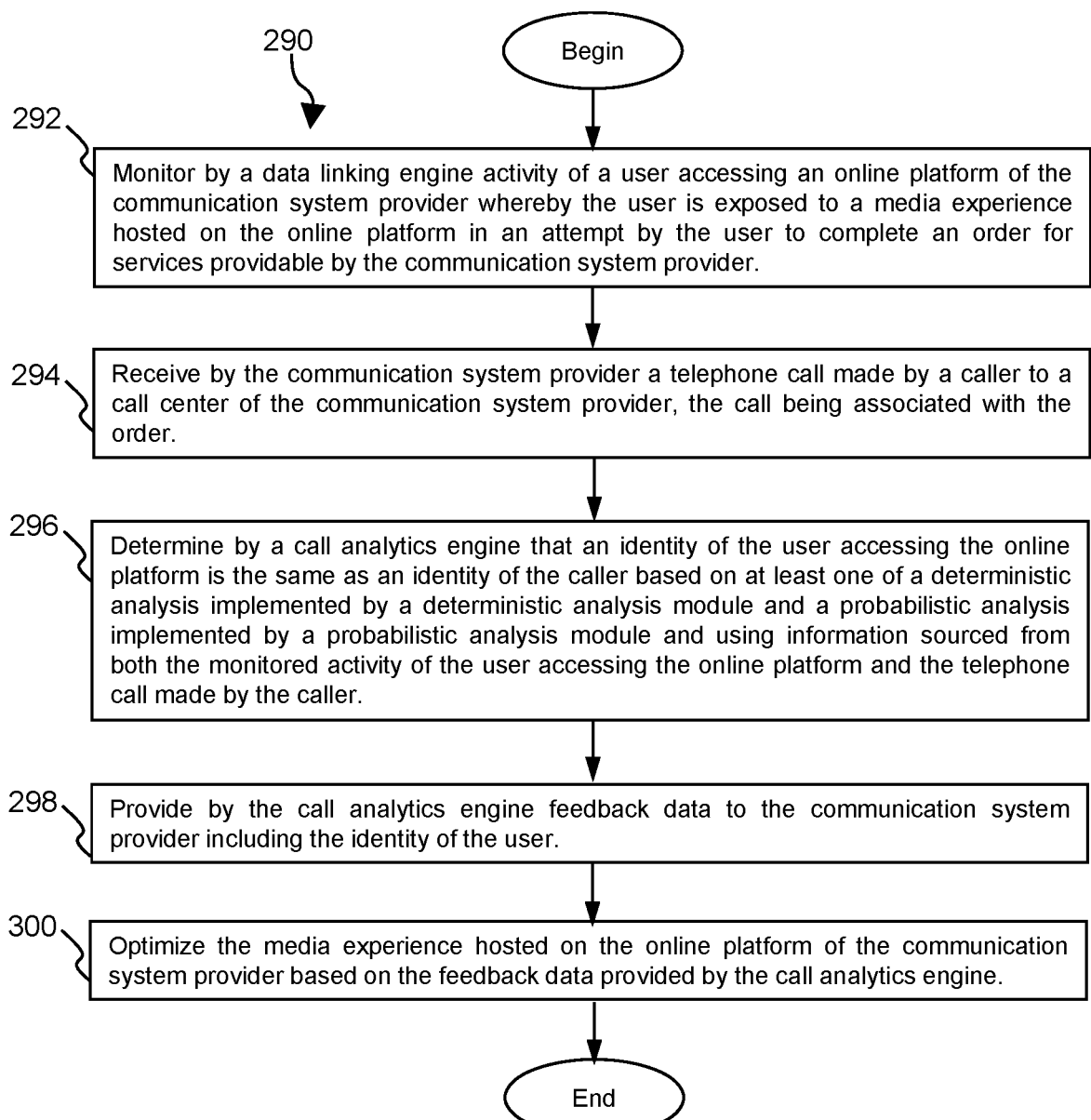

290

292

Begin

Monitor by a data linking engine activity of a user accessing an online platform of the communication system provider whereby the user is exposed to a media experience hosted on the online platform in an attempt by the user to complete an order for services providable by the communication system provider.

294

Receive by the communication system provider a telephone call made by a caller to a call center of the communication system provider, the call being associated with the order.

296

Determine by a call analytics engine that an identity of the user accessing the online platform is the same as an identity of the caller based on at least one of a deterministic analysis implemented by a deterministic analysis module and a probabilistic analysis implemented by a probabilistic analysis module and using information sourced from both the monitored activity of the user accessing the online platform and the telephone call made by the caller.

298

Provide by the call analytics engine feedback data to the communication system provider including the identity of the user.

300

Optimize the media experience hosted on the online platform of the communication system provider based on the feedback data provided by the call analytics engine.

End

5G NR Access Network 354a    354b    354c gNB    gNB    •••    gNB

359

Application Server 358    5G Core Network

360

Network

402

420

500

SYSTEMS AND METHODS FOR AUTOMATING MEDIA OPTIMIZATION USING CALL ANALYTICS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication system providers and other enterprises provide users with various types of media experiences for varying purposes including for entertainment, for providing desired information (e.g., technical support) to the user, and/or for conducting marketing campaigns in an attempt to obtain new subscribers. Communication system providers and other enterprises may provide media experiences to users through a variety of distinct media channels both directly through the communication system provider itself and indirectly through a third-party entity such as third-party media firms.

SUMMARY

In an embodiment, a method for automating media optimization for communication system providers using call analytics is disclosed. The method includes monitoring by a data linking engine activity of a user accessing an online platform of the communication system provider whereby the user is exposed to a media experience hosted on the online platform in an attempt by the user to complete an order for services providable by the communication system provider. The method additionally includes receiving by the communication system provider a telephone call made by a caller to a call center of the communication system provider, the call being associated with the offer, and determining by a data linking engine that an identity of the user accessing the online platform is the same as an identity of the caller based on at least one of a deterministic analysis implemented by a deterministic analysis module and a probabilistic analysis implemented by a probabilistic analysis module and using information sourced from both the monitored activity of the user accessing the online platform and the telephone call made by the caller. The method further includes providing by a call analytics engine feedback data to the communication system provider including the identity of the user, and optimizing the media experience hosted on the online platform of the communication system provider based on the feedback data provided by the call analytics engine.

In an embodiment, another method for automating media optimization for communication system providers using call analytics is disclosed. The method includes monitoring by a data linking engine activity of a user accessing an online platform of the communication system provider whereby the user is exposed to a media experience hosted on the online platform in an attempt by the user to complete an order for services providable by the communication system provider, and receiving by the communication system provider a telephone call made by a caller to a call center of the communication system provider, the call being associated with the order. The method additionally includes determining by the data linking engine that an identity of the user accessing the online platform is the same as an identity of the caller based on at least one of a deterministic analysis implemented by a deterministic analysis module and a probabilistic analysis implemented by a probabilistic analysis module and using information sourced from both the monitored activity of the user accessing the online platform and the telephone call made by the caller. The method further includes determining by the data linking engine a completion of the order by the user for the services providable by the communication system provider, and providing by a call analytics engine feedback data to at least one of the communication system providers and a third-party enterprise, the feedback data containing the identity of the user and a confirmation of the completion of the order by the user for the services providable by the communication system provider.

In an embodiment, another method for automating media optimization for communication system providers using call analytics. The method includes monitoring by a data linking engine activity of a user accessing an online platform of the communication system provider whereby the user is exposed to a media experience hosted on the online platform in an attempt by the user to complete an order for services providable by the communication system provider, and extracting by the data linking engine first contextual information from the monitored activity of the user accessing the online platform. The method additionally includes receiving by the communication system provider a telephone call made by a caller to a call center of the communication system provider, the call being associated with the offer, and extracting by a call analytics engine second contextual information from the telephone call made by the caller. The method further includes determining by a data linking engine that an identity of the user accessing the online platform is the same as an identity of the caller based on a probabilistic analysis implemented by a probabilistic analysis module which probabilistically matches the first contextual information extracted from the monitored activity of the user accessing the online platform with the second contextual information extracted from the telephone call made by the caller to the communication system provider.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 is a flow chart of a method according to an embodiment of the disclosure.

FIG. 5 is a flow chart of another method according to an embodiment of the disclosure.

FIG. 6 is a flow chart of another method according to an embodiment of the disclosure.

DETAILED DESCRIPTION

Figure 1:
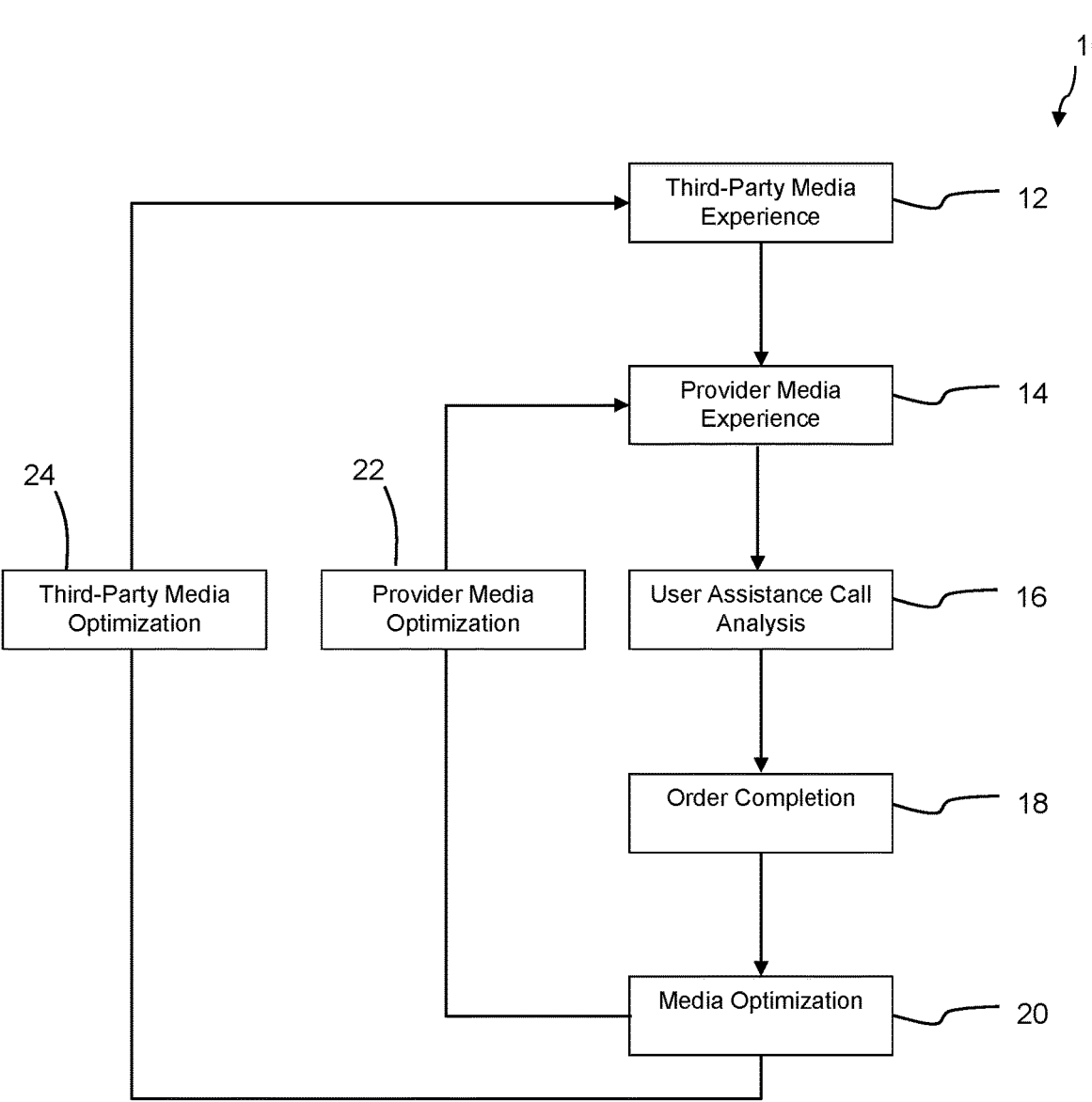
FIG. 1 is a flowchart of a method for automating media optimization using call analytics according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As described above, communication system providers provide media experiences (e.g., for the purposes of entertainment, providing desired information to the users, and/or marketing) to users to maximize user satisfaction and/or in an attempt to obtain new subscribers. Such media experiences may be provided through both media platforms hosted or maintained by the communication system provider (e.g., a website of the communication system provider, a mobile application of the communication system provider executable on user equipment (UE)) and through third-party media platforms (e.g., third-party websites and/or mobile applications).

It may be desirable to capture information indicative of the performance of media experiences provided through various media channels, including both media campaigns conducted through media platforms hosted by the communication system provider as well as media campaigns conducted through third-party media platforms such as through social media platforms. By analyzing this collected information, it may be determined (e.g., by the network service provider) to what degree a given media campaign was a success or failure. The results of such analysis may then be provided to developers of the communication system provider (e.g., developers of the website(s) and/or mobile applications used to conduct media campaigns) as well as third-party media firms (entities involved in creating the media materials hosted on third-party media platforms) such that the media campaigns conducted by and on the behalf of the communication system provider may be optimized to maximize user satisfaction and/or to maximize the number of new subscribers obtained when conducting future media campaigns. In this manner, the efficiency of such media campaigns may be maximized moving forward.

A current challenge in optimizing media campaigns conducted by and/or on the behalf of communication system providers and other enterprises is that the pathways extending between initial contact with a user and completion of an order (e.g., an order for one or more services provisioned by the communication system provider) are multifarious. As an example, some users when attempting to place an unassisted order (e.g., an order without assistance from a user assistance call center) via an online platform accessible via the Internet (e.g., through a website or mobile application hosted or maintained by the communication system provider) inspired by a media campaign implemented through the online platform experience difficulties which prevent them from completing the unassisted order. For example, the user may experience difficulty in finding a desired service on the online platform or understanding certain features of the desired service described in media experiences provided by the communication system provider. In another example, the user may experience difficulties in attempting to "check-out" or complete the unassisted order on the online platform (e.g., technical difficulties associated with the online platform, difficulties in understanding the bill presented as a media experience on the online platform).

The difficulties experienced by the user may in some instances cause the frustrated user to entirely forego with completing the order (e.g., the user may forego the desired service or may seek to obtain a similar service from a competitor enterprise). In other instances, the frustrated user may abandon the attempt to complete the unassisted order via the online platform and may instead seek assistance offline over the phone via the user assistance call center hosted by the communication system provider. The utilization of the user assistance call center by the user in attempting to complete the order is referred to as an "assisted order" herein. Additionally, orders made by users (e.g., after abandoning a prior failed unassisted order made via an online platform) offline via a telephone call, such as a call to a user assistance call center, are referred to herein as "offline" orders.

In such a scenario, conventional approaches are generally unable to associate the respective media campaign (e.g., hosted on the online platform through which the user initially attempted to complete the order) with the completed order made by the user via the user assistance call center. The inability to associate the respective media campaign with the completed order reduces the amount of data that may be collected and analyzed to optimize future media campaigns conducted by or on the behalf of the communication system provider, thereby resulting in less efficient future media campaigns which undesirably expend additional resources to achieve the same or lesser user satisfaction than would be the case if such media campaigns could be more reliably associated with the completed orders inspired by such media campaigns.

Accordingly, in an embodiment, systems and methods for automating media optimization using call analytics are provided. Particularly, information is collected from a plurality of discrete sources (e.g., information pertaining to a user making or who has made an order including an offline order) and, by deterministic and/or probabilistic analysis, successfully link successfully completed offline orders to the associated media experience (e.g., the specific media campaign) which originally inspired the offline order. The associated media experience may comprise a media experience provided by the communication service provider itself (referred to herein as "provider media experience") or a media experience provided by a third-party (referred to herein as "third-party media experience") such as a paid media campaign (e.g., a paid advertising campaign).

By linking or "stitching" offline order to the associated media experience, the associated media experience may be better optimized to maximize the efficiency of the media experience (e.g., the efficiency of a media campaign which includes the associated media experience) based on information concerning the user who completed the offline order. In this manner, besides user information collected from the completion of online orders as in accordance with conventional practice, additional user information may be collected from the completion of offline orders and linked to the specific media experiences associated with the completion of the offline order (e.g., the experience which originally inspired the user to make the order). This additional user information remains unused in conventional practice for optimizing media experiences, thereby leading to the implementation of media experiences which are not properly optimized.

As an example, by linking user information with the associated media experience, insights may be obtained regarding the success of a respective media experience with respect to particular characteristics of different users. For instance, it may be learned that users who have successfully completed an offline order associated with a respective media experience share a given characteristic and thus the efficiency of future media campaigns may be optimized by ensuring that similar media experiences target users having this particular characteristic. This may be referred to as enhancing the targeting of the media experience whereby the media experience is optimized to more specifically target users having characteristics that are positively correlated with the completion of orders (e.g., online orders, offline orders) when users sharing the particular characteristic are exposed to the media experience associated with the characteristic.

In an embodiment, in addition to better optimizing media experiences by linking media experiences with successfully completed offline orders associated with the experience, the information collected during this process may be leveraged to enhance the utility (e.g., the functionality) of the online platform hosting the associated media experience which resulted in user difficulties necessitating the user to transition from an unassisted order (made through the online platform) to an assisted order made offline such as through a user assistance call center. For instance, information pertaining to the difficulties or issues suffered by the user when using the online platform may be captured to provide insights to the communication system provider as to how the functionality of the given online platform (e.g., a website provisioned by the provider, a mobile application provisioned by the provider) may be improved.

Particularly, the additional information that is generally neither collected nor analyzed in conventional practices may provide insights to the communication system provider with respect to specific issues encountered by a large number of different users (e.g., a given interface, information, or other feature of the online platform including the media experience itself hosted on the platform may function improperly, confuse, or otherwise frustrate the large number of different users) when accessing a given online platform provisioned by the communication system provider. Additionally, it may be understood that, in some embodiments, this analysis of the additional information may be extended to increasing the utility of media experiences associated with the communication system provider (e.g., advertising services provided by the communication system provider) but hosted on third-party online platforms (e.g., social media platforms, third-party websites).

In addition to maximizing the customer satisfaction of users seeking to complete orders of services provided by the communication system provider, by enhancing the utility of such online platforms hosting an associated media experience, the number of users requiring assistance when completing an order (e.g., via a user assistance call center) may be reduced, minimizing the load applied to assistance resources furnished by the communication system provider including the user assistance call center. This may thus allow the communication system provider to more efficiently service its users while minimizing the expenditure of such assistance resources (e.g., expenditures associated with hosting the user assistance call center).

Further, beyond minimizing expenditures directed towards assistance resources provisioned by the communication system provider, minimizing difficulties encountered by users when ordering services of the provider via online platforms may reduce the number of users who entirely abandon their attempt to complete a given order after encountering difficulties with the online order, as described above. In other words, minimizing difficulties encountered by the users may increase the number of attempted orders made via online platforms which are ultimately successfully completed, thus maximizing the number of completed orders for a given number of attempted orders. In turn, these additional completed orders which previously would have been abandoned forms additional information which may be used as feedback to optimize the associated media experience.

Turning to FIG. 1, an embodiment of a method 10 for automating media optimization using call analytics is shown. It may be understood that method 10 (or at least certain steps thereof) may be implemented using a communication system as will be further elaborated below. Initially, method 10 includes providing a third-party media experience 12 to a user (e.g., via a display of a user device). The third-party media experience 12 may be provided on a third-party media platform on the behalf of a communication system provider. The third-party media platform may comprise a social media platform, a website, a mobile application, or other online platform accessible via the Internet. The third-party media experience 12 may form part of a media campaign implemented by a third-party enterprise (e.g., a third-party marketing or advertising firm) on the behalf of the communication system provider. The media campaign may comprise a collection of separate third-party media experiences 12 hosted on a variety of different third-party media platforms.

In this exemplary embodiment, method 10 continues by providing a communication system provider media experience 14 to a user (e.g., via a display of the user device). The provider media experience 14 is hosted on a provider media platform such as a website hosted by the communication system provider, a mobile application hosted by the provider, or other Internet accessible platforms hosted by the provider. For example, the provider media experience 14 may comprise a feature of a website hosted by the communication system provider through which the provider offers for sale one or more different services.

The provider media experience 14 may comprise marketing or advertising materials hosted on the provider platform (e.g., as part of a coordinated marketing campaign featuring one or more different services offered by the provider) or other materials such as explanatory information pertaining to services offered by the provider, checkout or billing features of the provider platform, or other features. Thus, the provider media experience 14 is not limited strictly to marketing or advertising materials and may additionally include other features or information hosted on provider platforms and which may be experienced by users accessing the provider platforms.

In this exemplary embodiment, method 10 continues by implementing user assistance call analysis 16. Particularly, at least some users attempting to complete an unassisted order via a provider platform (thereby receiving the provider media experience 14) may encounter difficulties preventing the user from completing the unassisted order or otherwise causing the user to head offline and seek assistance via a user assistance call center hosted by the communication system provider. The resulting call is analyzed to collect information pertaining to the nature of the call such as the nature of issues or difficulties encountered by the user when accessing a provider platform (e.g., difficulties or frustrations encountered by the user when provided by the provider media experience 14). The collected information may also pertain to the nature of the offer which the user is attempting to complete, including parameters of the offer and information pertaining to the nature of the service(s) associated with the offer. The collected information may also pertain to the identity or characteristics of the particular provider platform accessed by the user when attempting to make the unassisted order. Further, the collected information may also pertain to characteristics or other information associated with the user (e.g., user information specific to the given user). In some instances, the collected information may contain a transcription of the call made by the user to the user assistance call center.

As will be further elaborated below, in some instances the user assistance call analysis 16 may be leveraged as part of a deterministic or probabilistic analysis to link or stitch the call by the user received by the user assistance call center to the previously attempted order, as will be discussed further herein In this exemplary embodiment, method 10 continues through completion of the order (completed order 18) attempted by the user whereby one or more services are provided by the communication system provider to the user in response to the user executing a corresponding bill generated by the communication system provider.

The completed order 18 may comprise an unassisted order (e.g., an order completed without assistance via a provider platform in which the user encounters a provider media experience 14) or an assisted order completed during a phone call conducted via a user assistance call center. Thus, the completed order 18 may be completed online via an online platform such as a website or a mobile application of the communication system provider. Alternatively, the completed order 18 may be completed offline over the phone via the user assistance call center.

In this exemplary embodiment, method 10 continues by using data associated with the third-party media experience 12, the provider media experience 14, the user assistance call analysis 16, and the completed order 18 to optimize media (media optimization 20 in FIG. 1) experienced by the respective user. Media optimization 20 includes provider media optimization 22, which is provided as feedback data to the provider media experience 14 (e.g., to parties hosting the provider media experience 14). As an example, the feedback data defining provider media optimization 22 may include user information (e.g., information concerning the number and nature of accounts and services of the user held with the communication system provider). The feedback data may also include information concerning the user's experience of media hosted by the communication system provider such as information concerning a website or mobile application of the provider (e.g., information which features of the website or mobile application were accessed by the user and at what times, materials from which particular media campaigns to which the user was exposed). In the case of assisted orders, the information may also include call data associated with a telephone call placed by the user to a user assistance call center including, for example, the time and duration of the call, information conveyed by the user during the call concerning their experience of the communication system provider's media (e.g., the provider's website or mobile application, marketing or advertising materials associated with a given media campaign), the call disposition (e.g., confirmation of the completion of the order from persons associated with the user assistance call center, confirmation of the failure to complete the order and potentially an explanation for this failure (e.g., unattractiveness of the price, issues with the services)), the user's intent or reason for making the call, information conveyed by the user during the call concerning services of the provider associated with the order made by the user, and the like. Further, the feedback data may also include information concerning the completed order 18 such as the time of the making or completion of the order, the manner in which the order was completed (e.g., an unassisted order made online versus an assisted order made offline), the identity of the services and pricing information associated with the order, and the like. Further, it may be understood that each of these distinct datasets may be manipulated and analyzed by a data linking engine configured to link or stitch together these various distinct datasets.

The provider media optimization 22 may contain insights captured within the feedback data thereof for optimizing the provider media experience 14 gleaned from the various datasets described above. Exemplary insights may include insights pertaining to improving the functionality and usability of an online platform hosted by the communication system provider including a website and/or a mobile application of the provider. Additional insights may include ways in which marketing materials associated with a given media campaign exposed to the user may be optimized (e.g., via alterations to the marketing materials, more optimal targeting of the marketing materials based on information of the user) to improve the future performance or efficiency of the media campaign. For instance, insights for optimizing a provider's media campaign may include characteristics of users which correlate strongly with successful execution of the media campaign (e.g., characteristics which are highly common among users who complete orders following exposure to the media campaign).

Additionally, media optimization 20 includes third-party media optimization 24 which is provided as feedback data to the third-party media experience 12 (e.g., to parties tasked with optimizing a media campaign comprising the third-party media experience 12). The feedback data may include insights gleaned from various distinct datasets (similar to the datasets forming the feedback data of provider media optimization 22) which have been linked together by a data linking engine of the communication system provider. These insights may include insights for optimizing the third-party media experience 12 such as by optimizing the targeting of a media campaign comprising the third-party media experience 12. Similar to the provider media optimization 22 described above, such insights may include characteristics of users consistent with exposure to a given media campaign resulting in a completed order from the communication system provider. These insights may be provided to the third-party marketing or advertising firms to permit such firms to optimize the execution of future media campaigns on the behalf of the communication system provider.

Figure 2:
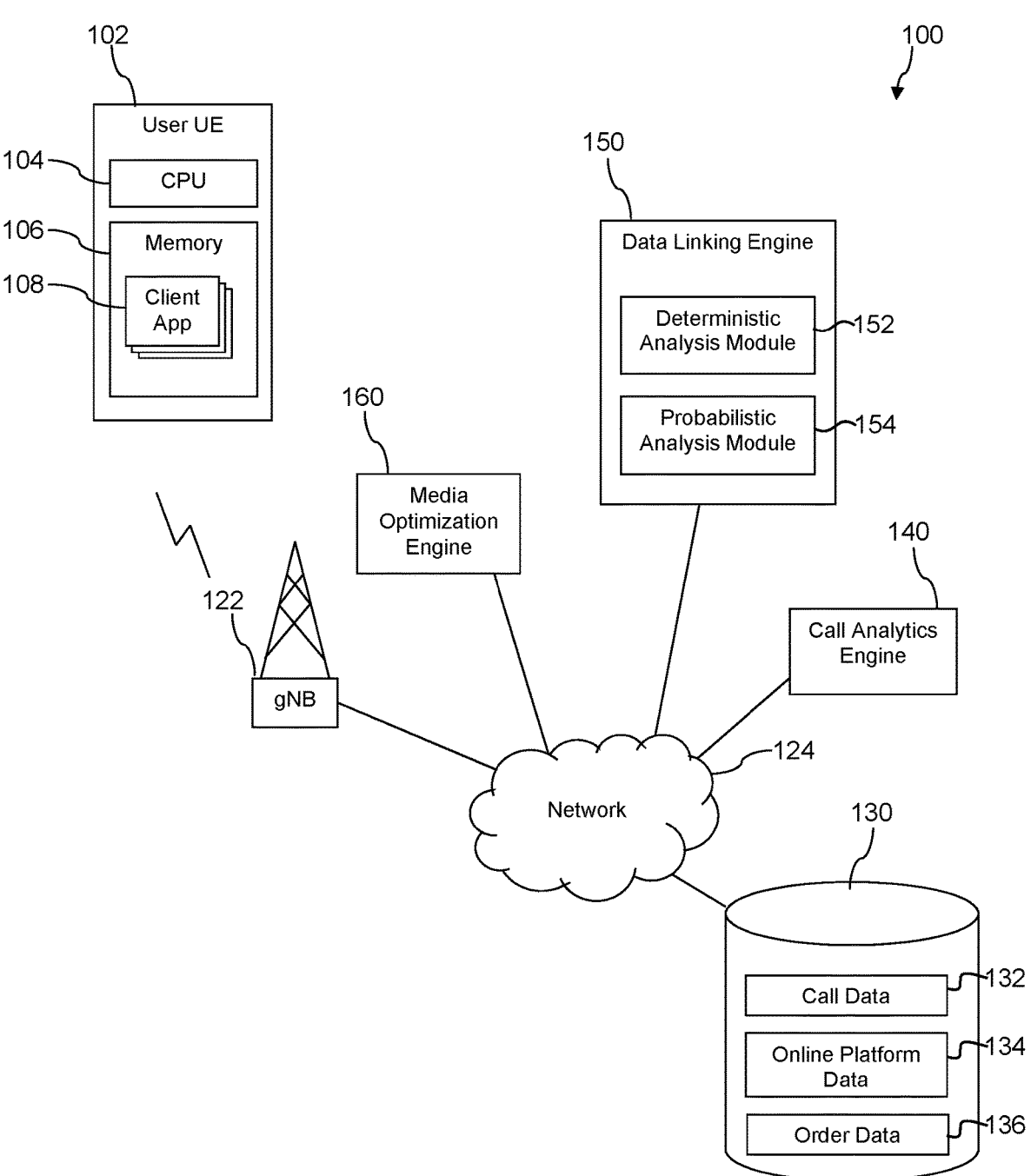
FIG. 2 is a block diagram of a communication system according to an embodiment of the disclosure.

Turning to FIG. 2, a communication system 100 is described. In an embodiment, the communication system 100 generally includes a user electronic device (user equipment-UE) 102, an access node 122, a network 124, a datastore 130, a call analytics engine 140, a data linking engine 150, and a media optimization engine 160. The UE 102 may comprise, for example, a desktop computer, a workstation, a laptop computer, a tablet computer, a smartphone, a wearable computer, an internet of things (IoT) device, and/or a notebook computer. User UE 102 may be operated by a user, customer, (or a potential customer) of the network 124 such as an enterprise, organization, or individual.

The access node 122 of communication system 100 may provide communication coupling the UE 102 to the network 124 according to a 5G protocol, for example 5G, 5G New Radio, or 5G LTE radio communication protocols. The access node 122 may provide communication coupling the UE 102 to the network 124 according to a long term evolution (LTE), a code division multiple access (CDMA), and/or a global system for mobile communication (GSM) radio communication protocol. The access node 122 may be referred to for some contexts as a gigabit Node B (gNB), an enhanced Node B (eNB), a cell site, or a cell tower. Additionally, UE 102 may be communicatively coupled to the network 124 via a WiFi access point or another non-cellular radio device. Further, while a single access node 122 is illustrated in FIG. 2, it is understood that communication system 100 may comprise any number of access nodes 122.

The network 124 of communication system 100 may comprise one or more public networks, one or more private networks, or a combination thereof. For example, network 124 may comprises a core network, such as a 5G core network. Further details of 5G networks are discussed below with reference to FIGS. 7A, 7B. While shown as communicatively coupled to the network 124, datastore 130, call analytics engine 140, data linking engine 150, and media optimization engine 160 may be considered part of network 124 and are illustrated as separate from network 124 in FIG. 2 to promote discussing their roles with respect to UE 102, as will be discussed further herein. Additionally, although in FIG. 2 network 124 is shown as including only a single datastore 130, it may be understood that network 124 may include varying numbers of datastores.

UE 102 includes a processor or CPU 104, and a memory 106 in signal communication with the processor 104. Additionally, UE 102 includes one or more client applications 108 stored in a non-transitory portion of the memory 106 and executable by the processor 104.

UE 102 may access various resources of network 124 through the access node 122. For example, a user of UE 102 may transmit information from UE 102 to the network 124 through the access node 122 and save the transmitted information on the network 124. For example, the user of UE 102 may access the Internet via the network 124 including a plurality of distinct online platforms including online platforms of the provider of communication system 100. Such online platforms include Internet websites of the communication system provider as well as one or more client applications 108 provided by the communication system provider.

The user via UE 102 and network 124 may make orders for various services offered by the communication system provider via the online platforms of the communication system provider. For example, the user via UE 102 may navigate to a website of the communication system provider or may utilize a client application 108 provided by the communication system provider where the user may be exposed to different provider media experiences hosted on the given website which may include different marketing or advertising materials (e.g., corresponding to one or more different media campaigns being implemented by the communication system provider) as well as information pertaining to different services offered by the provider.

In this manner, the user via UE 102 may attempt to complete an unassisted order for services providable by the communication system provider using the online platform. In some instances, the user may abandon the attempt to order the services providable by the communication system provider via the online platform. For instance, the user may entirely forego completing the order for the given services based on different considerations including, for example, issues with the particular services, the cost of the particular services, and difficulties in accessing or using the given online platform of the communication system provider, including difficulties with different media experiences or other features of the given online platform.

In certain instances, the user may entirely abandon the attempt to order the services providable by the communication system provider. In other instances, a user encountering difficulties when attempting to complete an unassisted order via the online platform may make a second attempt to complete the order as an assisted order by availing themselves of assistance resources provided by the communication system provider. For example, the user may make a telephone call (e.g., via UE 102) to a user assistance call center hosted by the communication system provider in order to complete the intended order. Indeed, in many such cases the user may successfully complete the order originally intended to be made via the online platform over the phone via the user assistance call center as an assisted order. Additionally, when accessing the user assistance call center, the user may click a link (including a telephone number providing user access to the user assistance call center) provided by the online platform. Alternatively, the user may access the user assistance call center via a third-party resource such as a search engine whereby the user may search for the number of the user assistance call center instead of accessing the line directly from an online platform of the communication system provider.

In this exemplary embodiment, datastore 130 of communication system 100 comprises a plurality of distinct datasets including, as shown in FIG. 2, call data 132, online platform data 134, and order data 136. While datasets 132, 134, and 136 are shown in FIG. 2 as belonging to the same datastore 130, it may be understood that datasets 132, 134, and 136 may be housed in a single datastore or a plurality of separate datastores.

Call data 132 of communication system 100 includes information associated with telephone calls placed by users to the user assistance call center including, for example, the time and duration of the call, information conveyed by the user during the call concerning their experience of the communication system provider's media (e.g., features of the provider's online platforms such as a website or mobile application, marketing or advertising materials associated with a given media campaign), the call disposition (e.g., confirmation of the completion of the order from persons associated with the user assistance call center, confirmation of the failure to complete the order and potentially an explanation for this failure), the user's intent or reason for making the call, and information conveyed by the user during the call concerning services of the provider associated with the order made by the user. Call data 132 thus defines a record of calls made by users to the user assistance call center and may be at least partially sourced from, for example, a call center of the communication system provider.

Online platform data 134 of communication system 100 includes data sourced from online platforms of the provider accessed by users attempting to order services providable by the communication system provider. For example, online platform data 134 may include information pertaining to which media of the online platform of the provider (e.g., a website or client application 108) were accessed by a particular user and at what times. The media of the online platform accessed by the user may comprise functional features of the online platform (e.g., a feature for accessing information pertaining to the various services offered by the communication system provider, a feature for completing orders for the various services offered by the provider) usable by the user. In addition, the media of the online platform accessed by the user may also include marketing or advertising materials associated with one or more media campaigns conducted by the communication system provider. The online platform data 134 thus forms or defines a record of the user's experience and activities in accessing the online platform of the communication system provider and may be sourced by an online platform tracking system of the communication system provider.

Order data 136 of communication system 100 includes information concerning orders made by users such as, for example, the time of the making or completion of the order, and the manner in which the order was completed such as whether the order was an unassisted order made via an online platform (e.g., a website or client application 108) or an assisted order in which the user has availed themselves of user assistance resources provided by the communication system provider such as the user assistance call center. In addition, order data 136 may include the identity and specification of the services and pricing information associated with an order made by a given user. Order data 136 thus defines a record of orders (including unassisted orders and assisted orders) made by users for various services providable by the communication system provider and may be sourced from an order tracking system of the communication system provider.

In an embodiment, the call analytics engine 140 may capture, analyze, or otherwise manipulate or utilize the call data 132 stored in datastore 130. Particularly, call analytics engine 140 captures or extracts from a given telephone call (e.g., made between a user and the user assistance call center) information forming at least some of the data of call data 132 of datastore 130. For example, in some embodiments, call analytics engine 140 may estimate the user's intent or reason for making the call, record salient information conveyed by the user during the call (e.g., concerning the user's experience of provider media hosted on the internet platform), and estimate whether or not the order was completed during the call. In certain embodiments, call analytics engine 140 may also automatically transcribe the call so that the transcription may be stored as call data 132.

In addition, with the assistance of data linking engine 150 of communication system 100, call analytics engine 140 may match the identity of a user who has completed an order offline via the user assistance call center (captured in call data 132) to the identity of a user who previously attempted to make an unassisted order via an online platform (e.g., captured in online platform data 134 and/or order data 136).

The matching of the identity of the caller with the identity of the user accessing the online platform of the communication system provider may be made deterministically or probabilistically as will be discussed further herein.

Data linking engine 150 is generally configured to link or stitch together the separate and differently sourced datasets of datastore 130 (e.g., datasets 132, 134, and 136) such that the plurality of separate datasets may be communally analyzed (e.g., statistically analyzed) and/or manipulated (e.g., joined together via a join function or other manipulation) via the data linking engine 150 and/or the call analytics engine 140.

Particularly, in this exemplary embodiment, data linking engine 150 includes both a deterministic analysis module 152 and a probabilistic analysis module 154 for matching the identity of a caller seeking to complete an order for services providable by the communication system provider via the user assistance call center to the identity of a user previously attempting to make the same order using an online platform of the communication system provider.

Deterministic analysis module 152 of data linking engine 150 is generally configured to make a deterministic match between the identity of the caller seeking to complete an order and the identity of the user previously attempting to make the same order using the online platform. The term "deterministic match" as used herein refers to corroborating a specific identifier of the caller with a predefined specific identifier of the user accessing the online platform.

As an example, in some embodiments, the user may access the user assistance call center by clicking a link provided on the online platform where the link provides the user with a telephone number for accessing the user assistance call center specific or unique to the respective user. When the user clicks the link to establish the call with the user assistance call center, the call analytics engine 140 may identify the user from the specific telephone number provided to the user. In this manner, the telephone number acts as a specific identifier which is initially assigned to the given user while the user is accessing the online platform and which may later be cross-checked or corroborated by the call analytics engine 140 once the user has dialed into the user assistance call center using the specifically assigned telephone number.

Alternatively, in certain embodiments, the user when accessing the online platform may provide (e.g., upon request from a feature of the online platform such as a login feature of the online platform) personally identifying information (PII) (e.g., an identity of any accounts the user holds with the communication system provider, the user's name, the user's address, and the like). Additionally, the user, after dialing into the user assistance call center (e.g., via a generic number that does not identify the user), may similarly provide (e.g., upon request via an interactive voice response (IVR) system of the telephone line and/or an operator of the telephone line) PII which may be corroborated by the call analytics engine 140 with the PII previously supplied by the user when accessing the online platform of the communication system provider in an earlier (frustrated) attempt to complete the order. In this manner, the user's PII acts as a specific identifier which may be initially received from the user when accessing the online platform and which may later be cross-checked or corroborated by the call analytics engine 140 once the user has again supplied the matching PII when calling the user assistance call center.

Probabilistic analysis module 154 of data linking engine 150 is conversely configured to estimate probabilistically a match (e.g., make a probabilistic match) between the identity of the caller seeking to complete an order and the identity of the user previously attempting to make the same order using the online platform. The term "probabilistic match" as used herein refers to corroborating first contextual information sourced or obtained from the user's activity on the communication system provider's online platform with second contextual information sourced or obtained from the call from the user to the user assistance call center where the second contextual information varies in at least some respects from the first contextual information. A probabilistic match may be made in instances even where there is no unique identifier available to make a deterministic match between a user attempting to complete an order via an online platform and a caller accessing the user assistance call center. It may be understood that a probabilistic match is not a confirmation that the online platform user and the caller necessarily share the same identity (they are the same user), but instead is an inference that the online platform user and the caller are likely to be or probably are the same user.

The contextual information corroborated by probabilistic analysis module 154 may be gleaned or extracted from one or more of the call data 132, online platform data 134, and order data 136. As an example, probabilistic analysis module 154 may infer a probabilistic match based on the timing (e.g., the time at which the user attempted to complete the order via the online platform) and the nature of the services of the order which the user attempted to complete via the provider's online platform (e.g., obtained from online platform data 134) with the timing (e.g., the time the call took place) and the nature of the services of the order which the user completed via the provider's user assistance call center (e.g., obtained from call data 132). In another example, probabilistic analysis module 154 may infer a probabilistic match based on statements made by the caller (captured as call data 132 by call analytics engine 140) from which the identity of the caller may be probabilistically matched with the identity of a user who previously accessed an online platform of the communication system provider.

For instance, it may be inferred that a first user who calls the user assistance call center at a time close to but following the time (e.g., within two weeks or less in some embodiments, within a week or less in some embodiments, within an hour or less in other embodiments) at which a second user accessed an online platform of the provider in association with the same services discussed during the telephone call share the same identity given the similarity in contextual information between the activity on the provider's online platform and the telephone call.

The media optimization engine 160 of communication system 100 is generally configured to analyze the information provided by datastore 130 (e.g., from datasets 132, 134, and 136), call analytics engine 140, and data linking engine 150 to thereby generate insights for optimizing both provider media (e.g., media experiences provided by online platforms of the communication system provider) and third-party media (e.g., third-party media experiences provided on third-party online platforms as part of one or more media campaigns) in the form of feedback data or signals.

In an embodiment, media optimization engine 160 may generate feedback data for optimizing provider and/or third-party media by leveraging the deterministic and probabilistic matching between online platform users and callers accessing the user assistance call center. Particularly, media optimization engine 160 may correlate a media experience to which the online platform user was exposed prior to or as the user attempted to complete the unassisted order with a specific media campaign implemented by the communication system provider or by a third-party enterprise (e.g., a third-party advertising or marketing firm) on the behalf of the provider.

In some instances, this correlation may be performed using the online platform data 134 (potentially in conjunction with order data 136) which may identity any media to which the user was exposed during a given session in which the user attempted to complete an unassisted order and link the identified media to a specific media campaign. In certain instances, the correlation may be facilitated by call data 132 and call analytics engine 140. For instance, a caller may mention a particular media experience (e.g., a particular advertisement) which inspired the caller to order a given service providable by the communication system provider and where this information may be captured by call analytics engine 140 as call data 132. The media optimization engine 160 may correlate this media exposure described by the caller with media associated with a specific media campaign.

Once the specific media campaign has been linked to the media exposure associated with a given user's completed order, the media optimization engine 160 may provide feedback data in the form of characteristics of the given user to facilitate more optimal targeting of the media campaign (e.g., such that they target users having similar characteristics as those of the given user's as well as other users known to positively respond to said media exposure). It may be understood that such feedback data may be provided to the communication system provider (e.g., personnel of the provider tasked with generating or hosting the given provider media) and/or to third-party enterprises (e.g., third-party marketing or advertising firms) tasked with conducting media campaigns on the behalf of the communication system provider.

In addition to optimizing media campaigns conducted by or on the behalf of the communication system provider (e.g., through optimized targeting of the media campaign), the media optimization engine 160 may also optimize non-marketing related media of the provider's such as media accessible via online platforms (e.g., websites, client applications 108) of the provider. As an example, call analytics engine 140 may capture as call data 132 information provided by a caller to the user assistance call center pertaining to difficulties experienced by the caller when accessing one of the provider's online platforms. Media optimization engine 160 may provide as feedback data to the communication system provider (e.g., to a team of the provider's tasked with hosting the given online platform) such that the provider may address the difficulty experienced by the caller. Moreover, difficulties of different callers may be captured systematically by call analytics engine 140 such that trends or particularly problematic issues of the provider's media (e.g., features of the provider's online platforms) may be identified and remediated.

Figure 3:
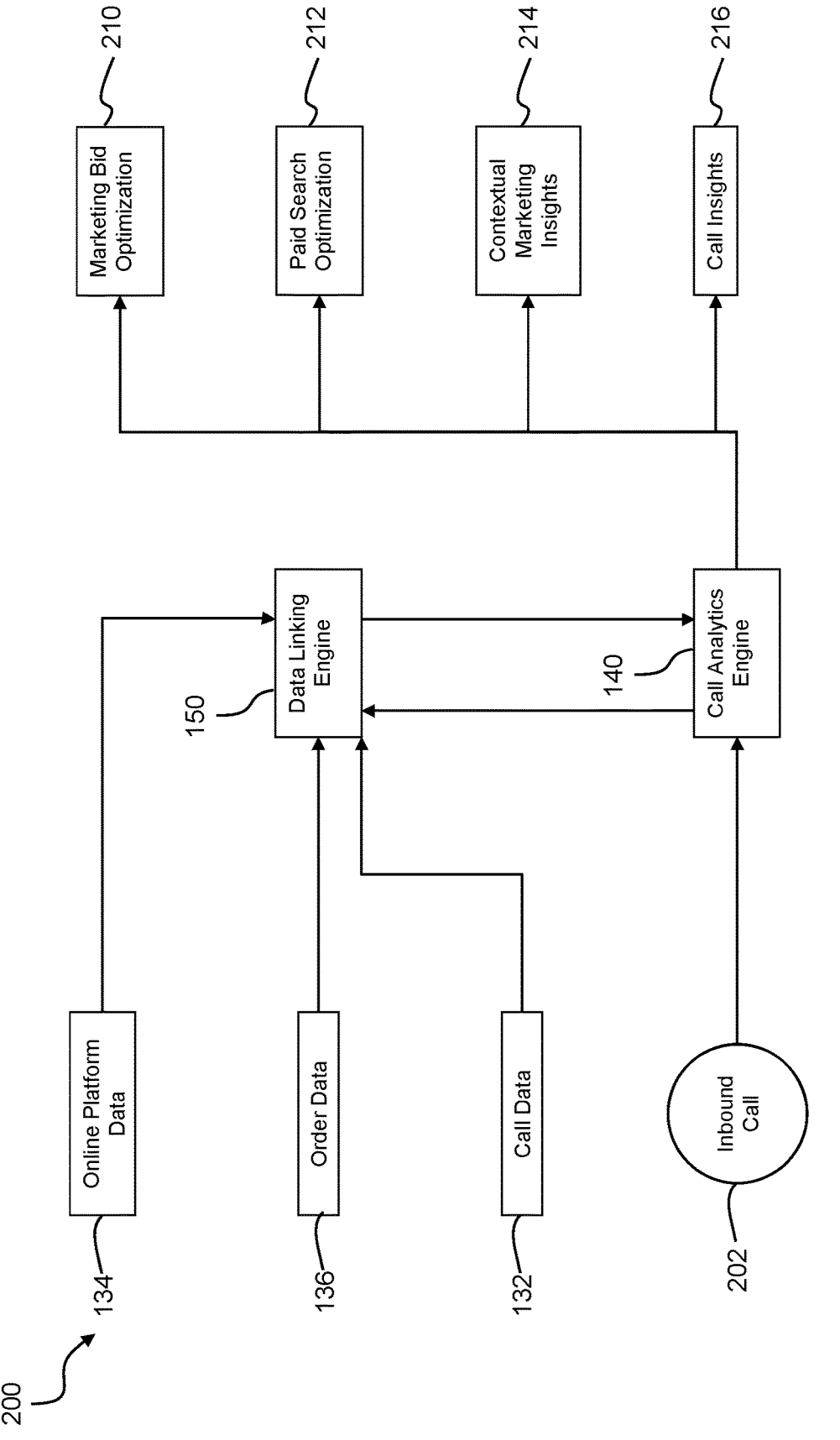
FIG. 3 is a flowchart of a method for automating media optimization using call analytics implemented using the communication system of FIG. 2 according to an embodiment of the disclosure.

Turning to FIG. 3, an embodiment of a method 200 for automating media optimization using call analytics is shown. Method 200 particularly highlights how insights in the form of feedback data for optimizing media campaigns conducted by or on the behalf of a communication system provider. In some embodiments, method 10 (or at least certain steps thereof) is implemented using the communication system 10 shown in FIG. 2.

Method 200 illustrates the flow of data from datasets 132, 134, and 136 (each storable in datastore 130 of communication system 100) to data linking engine 150. The flow of information from call data 132 to data linking engine 150 may include (on a per call basis) the call start time, call disposition, and the intent of or reason behind the call by the respective user. The call disposition refers to a specific outcome of the call such as whether the order was successfully completed, and whether the order was aborted along with the reason why the order was aborted (e.g., due to issues with the services, pricing, or other reasons). Additionally, the flow of information from online platform data 134 to data linking engine 150 may include the order creation date, parameters of the services associated with the order, pricing information, and the like. Further, the flow of information from the order data 136 to data linking engine 150 may include web data (e.g., sourced from a website accessed by the user), application data (e.g., sourced from a client application accessed by the user when making the order), and the like.

As shown in FIG. 3, an inbound call 202 to a user assistance call center may be captured and analyzed by the call analytics engine 140 where salient information from the call (e.g., information which may be captured as call data 132, contextual information used for matching the caller to a user by the data linking engine 150) may be extracted by the call analytics engine 140. At least some of this extracted information may be communicated from call analytics engine 140 to the data linking engine 150. Additionally, at least some of the information obtained by data linking engine 150 from datasets 132, 134, and 136 may be communicated from data linking engine 150 to the call analytics engine 140 for processing by the call analytics engine 140. As an example, the call disposition obtained from call data 132 may be shared between the data linking engine 150 and call analytics engine 140.

The right side of FIG. 3 shows the flow of information in the form of feedback data from call analytics engine 140 to the communication system provider and/or to third-party enterprises conducting media campaigns on the behalf of the communication system provider. While this information is shown as flowing from call analytics engine 140, it may be understood that in other embodiments this information may flow instead from data linking engine 150 or media optimization engine 160. In some embodiments, media optimization engine 160 may comprise a module of the call analytics engine 140 and/or the data linking engine 150.

The feedback data provided by call analytics engine 140 may be used for marketing bid optimization 210. Particularly, the feedback data may provide information relevant in bidding on or selecting media campaigns which have an optimal conversion rate and/or click volume as specified by the feedback data. For instance, the feedback data may highlight specific keywords which have been shown by the datasets 132, 134, and/or 136 to lead to optimal conversion rates and click volumes. Additionally, the insights provided by the feedback data may pertain to information for optimizing the targeting (e.g., via user characteristics gleaned by call analytics engine 140) of respective media campaigns. In addition, the feedback data provided by call analytics engine 140 may be applied to paid search optimization 212 whereby paid searches obtained by the communication system provider may similarly be optimized (e.g., through better targeting, more optimal keyword usage) in view of the feedback data provided by call analytics engine 140.

In addition, the feedback data provided by call analytics engine 140 may comprise or provide contextual marketing insights 214. The term "contextual marketing" refers to marketing strategies in which users are provided targeted advertisements based on their search terms and/or recent Internet browsing behavior. The feedback data may be applied to optimize such contextual marketing strategies by providing additional information to enhance behavioral targeting of a respective contextual marketing strategy. Such additional information may be gleaned from statements made by callers accessing the user assistance call center or via other data sources such as online platform data 134 and order data 136.

Further, the feedback data provided by call analytics engine 140 may comprise or provide call insights 216. Call insights 216 may include information extracted by call analytics engine 140 from calls received by the user assistance call center. For example, such extracted information may include contextual information regarding the media experience(s) (e.g., marketing or advertising materials) which inspired the caller to complete the order for the given services potentially as well as the platform (e.g., the particular website, the particular social media platform) on which the user was exposed to given media. Such information, in addition to being useful for identifying the specific media campaign which may have inspired the given order, may also be utilized in gauging the relative value of specific media channels with respect to their success in generating orders from users.

Turning to FIG. 4, a method 250 is described. In an embodiment, the method 250 is a method for automating media optimization for communication system (e.g., communication system 100 illustrated in FIG. 2) providers using call analytics. Initially, at block 252, method 250 comprises monitoring by a data linking engine (e.g., data linking engine 150) activity of a user accessing an online platform of the communication system provider whereby the user is exposed to a media experience (e.g., media experiences 12 and 14 illustrated in FIG. 1) hosted on the online platform in an attempt by the user to complete an order for services providable by the communication system provider.

At block 254, method 250 comprises receiving by the communication system provider a telephone call (e.g., inbound call 202 illustrated in FIG. 3) made by a caller to a call center of the communication system provider, the call being associated with the order.

At block 256, method 250 comprises determining by a call analytics engine (e.g., call analytics engine 140 illustrated in FIG. 2) that an identity of the user accessing the online platform is the same as an identity of the caller based on at least one of a deterministic analysis implemented by a deterministic analysis module (e.g., deterministic analysis module 152 illustrated in FIG. 2) and a probabilistic analysis implemented by a probabilistic analysis module (e.g., probabilistic analysis module 154 illustrated in FIG. 2) and using information sourced from both the monitored activity of the user accessing the online platform and the telephone call made by the caller. In at least some embodiments, the call analytics engine determines that the identity of the user matches the identity of the caller based only on the probabilistic analysis provided by the probabilistic analysis module and not on the deterministic analysis provided by the deterministic analysis module.

At block 258, method 250 comprises determining by the data linking engine a completion of the order by the user for the services providable by the communication system provider. At block 260, method 250 comprises providing by the call analytics engine feedback data to at least one of the communication system providers and a third-party enterprise, the feedback data containing the identity of the user and a confirmation of the completion of the order by the user for the services providable by the communication system provider.

Turning to FIG. 5, a method 270 is described. In an embodiment, the method 270 is a method for automating media optimization for communication system (e.g., communication system 100 illustrated in FIG. 2) providers using call analytics. Initially, at block 272, method 270 comprises monitoring by a data linking engine (e.g., data linking engine 150 illustrated in FIG. 2) activity of a user accessing an online platform of the communication system provider whereby the user is exposed to a media experience (e.g., media experiences 12 and 14 illustrated in FIG. 1) hosted on the online platform in an attempt by the user to complete an order for services providable by the communication system provider.

At block 274, method 270 comprises extracting by the data linking engine first contextual information from the monitored activity of the user accessing the online platform. At block 276, method 270 comprises receiving by the communication system provider a telephone call (e.g., inbound call 202 illustrated in FIG. 3) made by a caller to a call center of the communication system provider, the call being associated with the offer. At block 278, method 270 comprises extracting by the call analytics engine second contextual information from the telephone call made by the caller.

At block 280, method 270 comprises determining by a call analytics engine (e.g., call analytics engine 140 illustrated in FIG. 2) that an identity of the user accessing the online platform is the same as an identity of the caller based on a probabilistic analysis implemented by a probabilistic analysis module (e.g., probabilistic analysis module 154 illustrated in FIG. 2) which probabilistically matches the first contextual information extracted from the monitored activity of the user accessing the online platform with the second contextual information extracted from the telephone call made by the caller to the communication system provider.

Turning to FIG. 6, a method 290 is described. In an embodiment, the method 290 is a method for automating media optimization for communication system (e.g., communication system 100 illustrated in FIG. 2) providers using call analytics. Initially, at block 292, method 290 comprises monitoring by a data linking engine (e.g., data linking engine 150 illustrated in FIG. 2) activity of a user accessing an online platform of the communication system provider whereby the user is exposed to a media experience (e.g., media experiences 12 and 14 illustrated in FIG. 1) hosted on the online platform in an attempt by the user to complete an order for services providable by the communication system provider.

At block 294, method 290 comprises receiving by the communication system provider a telephone call (e.g., inbound call 202 illustrated in FIG. 3) made by a caller to a call center of the communication system provider, the call being associated with the offer.

At block 296, method 290 comprises determining by a call analytics engine (e.g., call analytics engine 140 illustrated in FIG. 2) that an identity of the user accessing the online platform is the same as an identity of the caller based on at least one of a deterministic analysis implemented by a deterministic analysis module (e.g., deterministic analysis module 152 illustrated in FIG. 2) and a probabilistic analysis implemented by a probabilistic analysis module (e.g., probabilistic analysis module 154 illustrated in FIG. 2) and using information sourced from both the monitored activity of the user accessing the online platform and the telephone call made by the caller.

At block 298, method 290 comprises providing by the call analytics engine feedback data to the communication system provider including the identity of the user. At block 300, method 290 comprises optimizing the media experience hosted on the online platform of the communication system provider based on the feedback data provided by the call analytics engine.

Figure 7A:
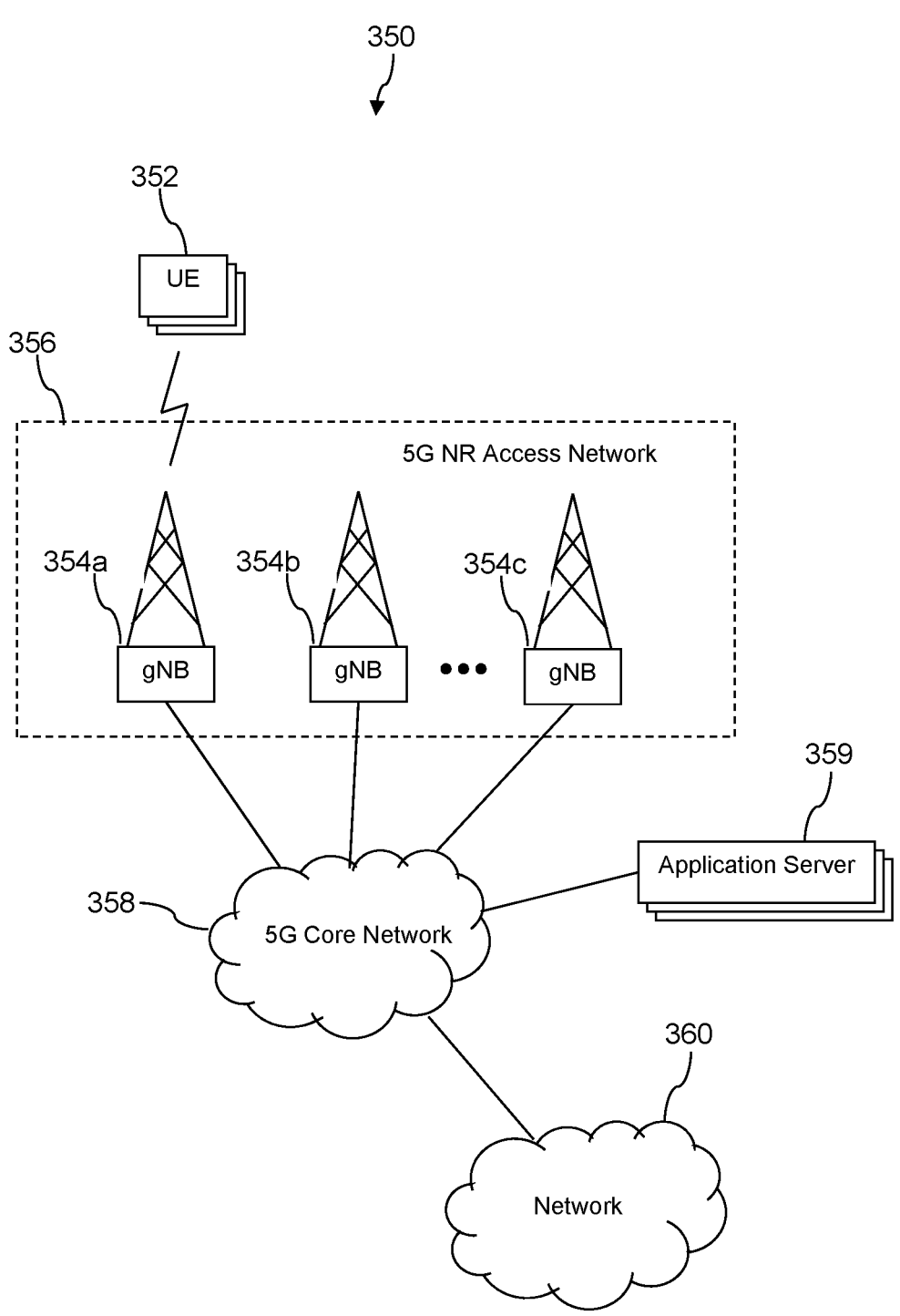
FIG. 7A is a block diagram of another communication system according to an embodiment of the disclosure.

Turning now to FIG. 7A, an exemplary communication system 350 is described. Typically, the communication system 350 includes a number of access nodes 354 that are configured to provide coverage in which UEs 352 such as cell phones, tablet computers, machine-type-communication devices, tracking devices, embedded wireless modules, and/or other wirelessly equipped communication devices (whether or not user operated), can operate. The access nodes 354 may be said to establish an access network 356. The access network 356 may be referred to as a radio access network (RAN) in some contexts.

In a 5G technology generation an access node 354 may be referred to as a next Generation Node B (gNB). In 4G technology (e.g., long term evolution (LTE) technology) an access node 354 may be referred to as an evolved Node B (eNB). In 3G technology (e.g., code division multiple access (CDMA) and global system for mobile communication (GSM)) an access node 354 may be referred to as a base transceiver station (BTS) combined with a base station controller (BSC). In some contexts, the access node 354 may be referred to as a cell site or a cell tower. In some implementations, a picocell may provide some of the functionality of an access node 354, albeit with a constrained coverage area. Each of these different embodiments of an access node 354 may be considered to provide roughly similar functions in the different technology generations.

In an embodiment, the access network 356 comprises a first access node 354*a*, a second access node 354*b*, and a third access node 354*c*. It is understood that the access network 356 may include any number of access nodes 354. Further, each access node 354 could be coupled with a core network 358 that provides connectivity with various application servers 359 and/or a network 360. In an embodiment, at least some of the application servers 359 may be located close to the network edge (e.g., geographically close to the UE 352 and the end user) to deliver so-called "edge computing." The network 360 may be one or more private networks, one or more public networks, or a combination thereof. The network 360 may comprise the public switched telephone network (PSTN). The network 360 may comprise the Internet. With this arrangement, a UE 352 within coverage of the access network 356 could engage in air-interface communication with an access node 354 and could thereby communicate via the access node 354 with various application servers and other entities.

The communication system 350 could operate in accordance with a particular radio access technology (RAT), with communications from an access node 354 to UEs 352 defining a downlink or forward link and communications from the UEs 352 to the access node 354 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 354 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 354 could define an air interface configured in a specific manner to define physical resources for carrying information wirelessly between the access node 354 and UEs 352.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 352.

In addition, certain resource elements on the example air interface could be reserved for special purposes. For instance, on the downlink, certain resource elements could be reserved to carry synchronization signals that UEs 352 could detect as an indication of the presence of coverage and to establish frame timing, other resource elements could be reserved to carry a reference signal that UEs 352 could measure in order to determine coverage strength, and still other resource elements could be reserved to carry other control signaling such as PRB-scheduling directives and acknowledgement messaging from the access node 354 to served UEs 352. And on the uplink, certain resource elements could be reserved to carry random access signaling from UEs 352 to the access node 354, and other resource elements could be reserved to carry other control signaling such as PRB-scheduling requests and acknowledgement signaling from UEs 352 to the access node 354.

The access node 354, in some instances, may be split functionally into a radio unit (RU), a distributed unit (DU), and a central unit (CU) where each of the RU, DU, and CU have distinctive roles to play in the access network 356. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 7B:
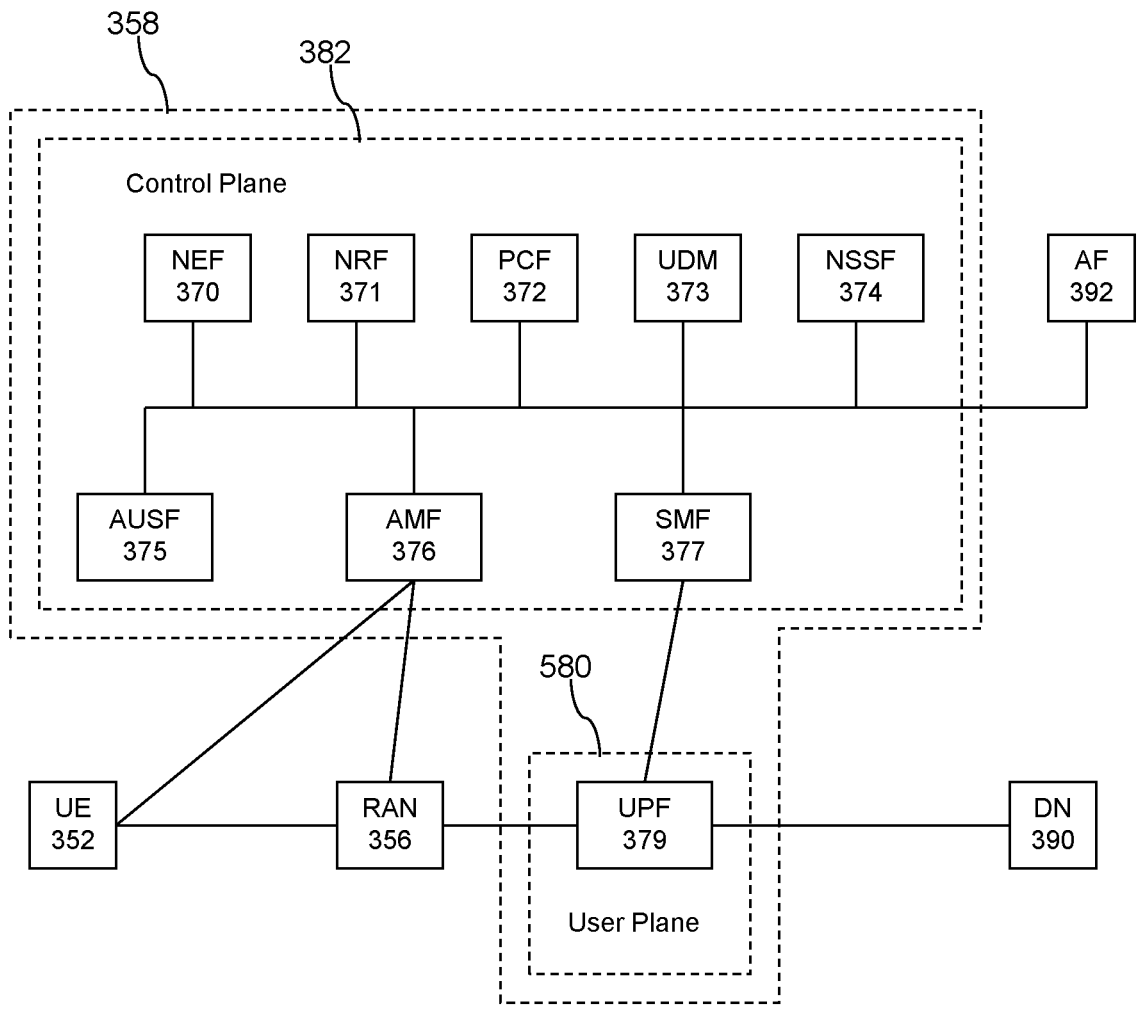
FIG. 7B is a block diagram of a core network of the communication system of FIG. 7A according to an embodiment of the disclosure.

Turning now to FIG. 7B, further details of the core network 358 are described. In an embodiment, the core network 358 is a 5G core network. 5G core network technology is based on a service-based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 379, an authentication server function (AUSF) 375, an access and mobility management function (AMF) 376, a SMF 377, a network exposure function (NEF) 370, a network repository function (NRF) 371, a policy control function (PCF) 372, a UDM 373, a network slice selection function (NSSF) 374, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 358 may be segregated into a user plane 380 and a control plane 382, thereby promoting independent scalability, evolution, and flexible deployment.

The UPF 379 delivers packet processing and links the UE 352, via the access network 356, to a data network 390 (e.g., the network 360 illustrated in FIG. 7A). The AMF 376 handles registration and connection management of non-access stratum (NAS) signaling with the UE 352. Said in other words, the AMF 376 manages UE registration and mobility issues. The AMF 376 manages reachability of the UEs 352 as well as various security issues. The SMF 377 handles session management issues. Specifically, the SMF 377 creates, updates, and removes (destroys) PDU sessions and manages the session context within the UPF 379. The SMF 377 decouples other control plane functions from user plane functions by performing dynamic host configuration protocol (DHCP) functions and IP address management functions. The AUSF 375 facilitates security processes.

The NEF 370 securely exposes the services and capabilities provided by network functions. The NRF 371 supports service registration by network functions and discovery of network functions by other network functions. The PCF 372 supports policy control decisions and flow based charging control. The UDM 373 manages network user data and can be paired with a user data repository (UDR) that stores user data such as customer profile information, customer authentication number, and encryption keys for the information. An application function 392, which may be located outside of the core network 358, exposes the application layer for interacting with the core network 358. In an embodiment, the application function 392 may be execute on an application server 359 located geographically proximate to the UE 352 in an "edge computing" deployment mode. The core network 358 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 374 can help the AMF 376 to select the network slice instance (NSI) for use with the UE 352.

Figure 8A:
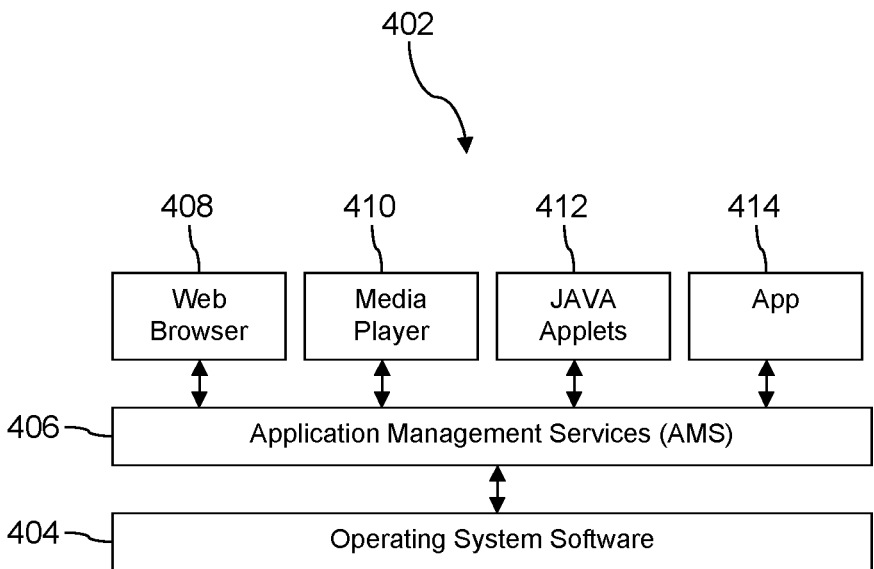
FIG. 8A is a block diagram of a software environment according to an embodiment of the disclosure.

FIG. 8A illustrates a software environment 402 that may be implemented by the DSP 302. The DSP 302 executes operating system software 404 that provides a platform from which the rest of the software operates. The operating system software 404 may provide a variety of drivers for the handset hardware with standardized interfaces that are accessible to application software. The operating system software 404 may be coupled to and interact with application management services (AMS) 406 that transfer control between applications running on the UE 400. Also shown in FIG. 8A are a web browser application 408, a media player application 410, and JAVA applets 412. The web browser application 408 may be executed by the UE 400 to browse content and/or the Internet, for example when the UE 400 is coupled to a network via a wireless link. The web browser application 408 may permit a user to enter information into forms and select links to retrieve and view web pages. The media player application 410 may be executed by the UE 400 to play audio or audiovisual media. The JAVA applets 412 may be executed by the UE 400 to provide a variety of functionality including games, utilities, and other functionality.

Figure 8B:
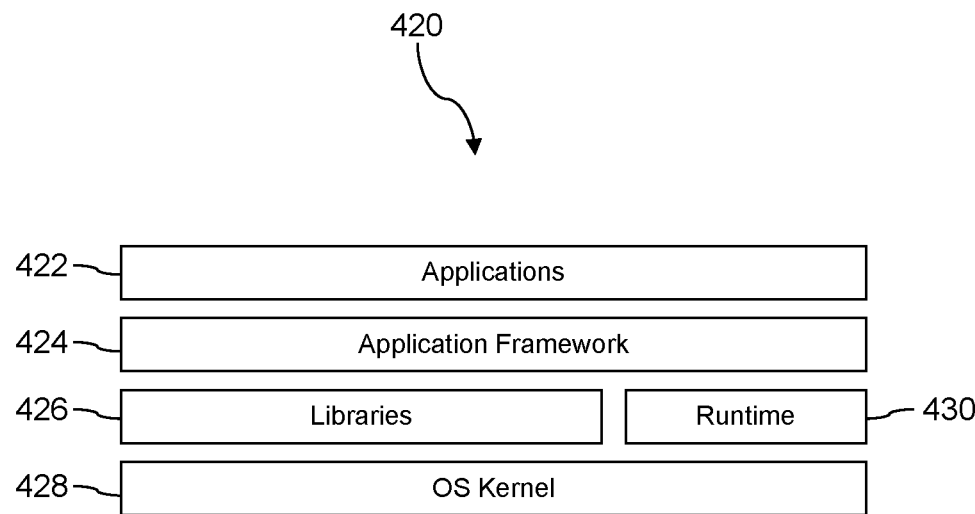
FIG. 8B is a block diagram of another software environment according to an embodiment of the disclosure.

FIG. 8B illustrates an alternative software environment 420 that may be implemented by the DSP 302. The DSP 302 executes operating system kernel (OS kernel) 428 and an execution runtime 430. The DSP 302 executes applications 422 that may execute in the execution runtime 430 and may rely upon services provided by the application framework 424. Applications 422 and the application framework 424 may rely upon functionality provided via the libraries 426.

Figure 9:
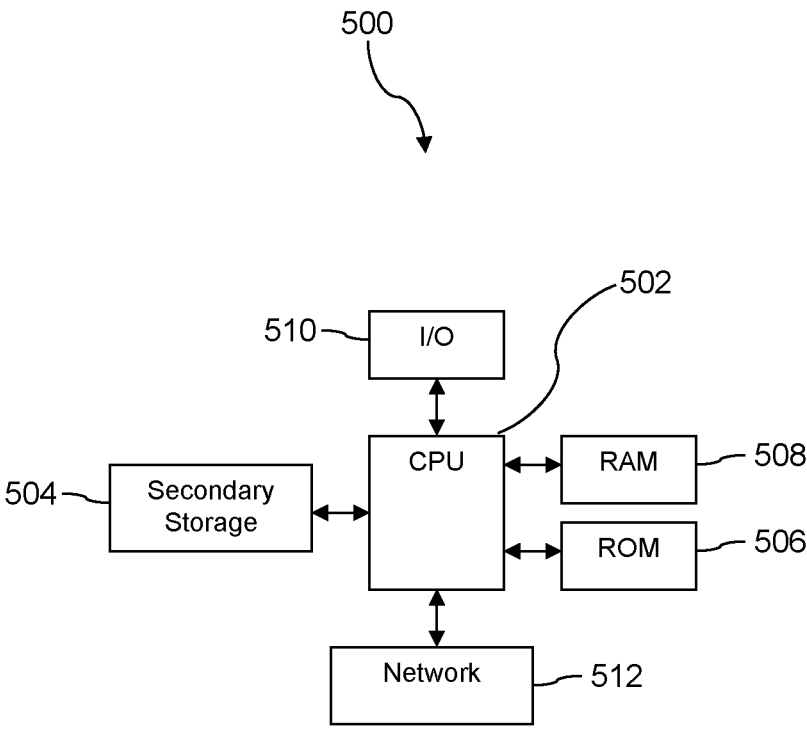
FIG. 9 is a block diagram of a computer system according to an embodiment of the disclosure.

FIG. 9 illustrates a computer system 500 suitable for implementing one or more embodiments disclosed herein. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 502 executes instructions, codes, computer programs, scripts which it accesses from hard disk, floppy disk, optical disk (these various disk-based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for automating media optimization for communication system providers using call analytics, the method comprising:

monitoring by a data linking engine activity of a user accessing an online platform of the communication system provider whereby the user is exposed to a media experience hosted on the online platform in an attempt by the user to complete an order for services providable by the communication system provider;

receiving by the communication system provider a telephone call made by a caller to a call center of the communication system provider, the call being associated with an offer;

determining by a data linking engine that an identity of the user accessing the online platform is the same as an identity of the caller based on at least one of a deterministic analysis implemented by a deterministic analysis module and a probabilistic analysis implemented by a probabilistic analysis module and using information sourced from both the monitored activity of the user accessing the online platform and the telephone call made by the caller;

providing by a call analytics engine feedback data to the communication system provider including the identity of the user; and optimizing the media experience hosted on the online platform of the communication system provider based on the feedback data provided by the call analytics engine.

2. The method of claim 1, wherein the online platform comprises at least one of websites of the communication system provider and a mobile application of the communication system provider.

3. The method of claim 1, wherein optimizing the media experience comprises optimizing a functional feature of the online platform to enhance usability of the online platform.

4. The method of claim 1, wherein optimizing the media experience comprises optimizing marketing materials hosted on the online platform.

5. The method of claim 1, wherein the media experience exposed to the user comprises at least one of functional features of the online platform and a marketing material.

6. A method for automating media optimization for communication system providers using call analytics, the method comprising:

monitoring by a data linking engine activity of a user accessing an online platform of the communication system provider whereby the user is exposed to a media experience hosted on the online platform in an attempt by the user to complete an order for services providable by the communication system provider;

receiving by the communication system provider a telephone call made by a caller to a call center of the communication system provider, the call being associated with the order;

determining by the data linking engine that an identity of the user accessing the online platform is the same as an identity of the caller based on at least one of a deterministic analysis implemented by a deterministic analysis module and a probabilistic analysis implemented by a probabilistic analysis module and using information sourced from both the monitored activity of the user accessing the online platform and the telephone call made by the caller;

determining by the data linking engine a completion of the order by the user for the services providable by the communication system provider; and providing by a call analytics engine feedback data to at least one of the communication system providers and a third-party enterprise, the feedback data containing the identity of the user and a confirmation of the completion of the order by the user for the services providable by the communication system provider.

7. The method of claim 6, wherein the media experience exposed to the user comprises at least one of functional features of the online platform and a marketing material.

8. The method of claim 6, further comprising:

determining by the deterministic analysis module a deterministic match between identity of the user accessing the online platform and the identity of the caller by matching a unique identifier of the user accessing the online platform with a unique identifier of the caller.

9. The method of claim 8, wherein the unique identifier comprises personally identifying information (PII) of the user.

10. The method of claim 6, further comprising:

determining by the probabilistic analysis module a probabilistic match between identity of the user accessing the online platform and the identity of the caller by corroborating first contextual information sourced from the user's activity when accessing the online platform with second contextual information sourced from the telephone call made by the caller.

11. The method of claim 10, wherein the first contextual information comprises a time at which the user accessed the online platform and the second contextual information comprises a time at which the telephone call by the caller was made.

12. The method of claim 6, wherein the feedback data comprises one or more characteristics of the user.

13. The method of claim 6, wherein the feedback data comprises information provided by the caller to the call center pertaining to at least one of the services providable by the communication system provider and the media experience exposed to the user.

14. The method of claim 6, wherein the feedback data comprises information pertaining to an intent of the caller in making the telephone call.

15. A method for automating media optimization for communication system providers using call analytics, the method comprising:

monitoring by a data linking engine activity of a user accessing an online platform of a communication system provider whereby the user is exposed to a media experience hosted on the online platform in an attempt by the user to complete an order for services providable by the communication system provider;

extracting by the data linking engine first contextual information from the monitored activity of the user accessing the online platform;

receiving by the communication system provider a telephone call made by a caller to a call center of the communication system provider, the call being associated with an offer;

extracting by a call analytics engine second contextual information from the telephone call made by the caller; and determining by a data linking engine that an identity of the user accessing the online platform is the same as an identity of the caller based on a probabilistic analysis implemented by a probabilistic analysis module which probabilistically matches the first contextual information extracted from the monitored activity of the user accessing the online platform with the second contextual information extracted from the telephone call made by the caller to the communication system provider.

16. The method of claim 15, further comprising:

determining by the data linking engine a completion of the order by the user for the services providable by the communication system provider; and providing by the call analytics engine feedback data to at least one of the communication system providers and a third-party enterprise, the feedback data containing the identity of the user and a confirmation of the completion of the order by the user for the services providable by the communication system provider.

17. The method of claim 15, wherein the first contextual information comprises a time at which the user accessed the online platform and the second contextual information comprises a time at which the telephone call by the caller was made.

18. The method of claim 15, wherein the first contextual information and the second contextual information each comprises characteristics of the services pertaining to the offer.

19. The method of claim 15, wherein the second contextual information is sourced from statements made by the caller during the telephone call.

20. The method of claim 15, wherein the media experience exposed to the user comprises at least one of functional features of the online platform and a marketing material.

* * * * *